United States Patent

[11] 3,568,164

[72] Inventor Robert Schiller
Silver Spring, Md.

[21] Appl. No. 772,934
[22] Filed Nov. 4, 1968
[45] Patented Mar. 2, 1971

[73] Assignee Computer Entry Systems Corporation
Silver Spring, Md.

[54] COMPUTER INPUT SYSTEM
5 Claims, 2 Drawing Figs.

Figure 1:
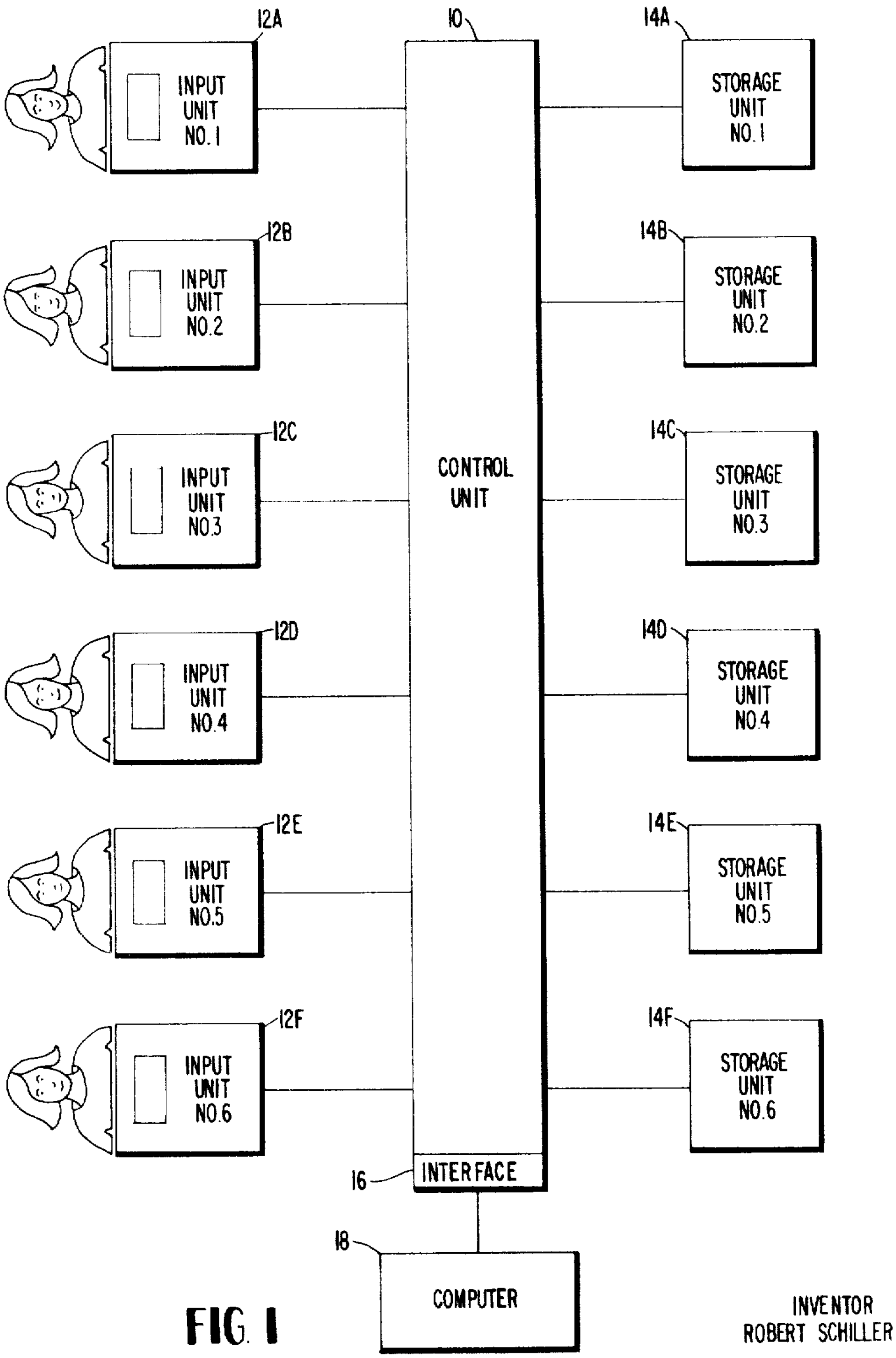

[52] U.S. Cl. ........ 340/172.5
[51] Int. Cl. ........ G06f 9/18
[50] Field of Search ........ 340/172.5; 235/157

[56] References Cited

UNITED STATES PATENTS 3,413,613 11/1968 Bahrs et al. ........ 340/172.5
3,483,523 12/1969 Cogar et al. ........ 340/172.5
3,483,525 12/1969 Bahrs et al. ........ 340/172.5

*Primary Examiner*—Raulfe B. Zache
*Attorney*—Morton, Bernard, Brown, Roberts & Sutherland ABSTRACT: A computer input system. Data from a plurality of input units is transmitted through a single time-shared control unit to a like plurality of tape storage units. The control unit sequentially scans the several input units, and, when an input unit has a data character ready for storage, the control unit transfers the character to a buffer storage unit within the control unit. After a complete data record is in the buffer storage, it is transferred to the associated tape storage unit, and another data record is then applied from the input unit to buffer storage. After all data records are in the tape storage, they can be transferred through the same control unit to a utilizing computer without manual handling of the tape. The time-shared control unit cycles at a rate which permits continuous operation by all input units.

INVENTOR
ROBERT SCHILLER
BY
McLean, Morton & Boustead
ATTORNEYS

COMPUTER INPUT SYSTEM

The present invention pertains to a data transfer system. More particularly, the present invention pertains to a system for entering data into a digital computer while permitting maximum utilization of the computer speed and capacity.

Automatic data processing systems have been developed which are capable of high speed handling of large quantities of data. Computers are available which can perform arithmetic operations in nanoseconds. Such computers are expensive equipment. Consequently, to be economical, they must be utilized close to their maximum operating speed as much of the time as possible. The slowest step in the utilization of such high speed computer systems is the entry of data into the computer for processing, and so it is desirable to enter large quantities of data into the computer during any given data-entry interval so that the computer can then perform its operations during relatively long uninterrupted intervals.

It is necessary for a human operator to take the initial steps which lead to the entry of data into a computer. One of the first methods developed for entry of data was the punched card. Using this method a human operator utilizing appropriate card punching equipment, frequently termed a key punch, causes holes to be punched into a card of a relatively stiff paper, with the locations of these holes representing numerical or alphabetical data. Typically, each punched card might contain a data record of 80 characters. The punched cards are then processed through the computer input mechanism so that the data is stored in the computer memory. The card reading process is the limiting factor so far as speed of computer operation is concerned. Card readers generally are capable of operating at a speed in the order of 25 cards per second. Even at a speed of 25 entries per second, 40 milliseconds are consumed for each entry. When the computer is capable of performing operations in the nanosecond or the microsecond range, this 40 millisecond entry times wastes valuable computer time.

To improve the efficiency of data entry into a digital computer, punched cards are often processed through equipment which reads the data from the cards and records it on magnetic tape where it can be conveniently stored. This magnetic tape is then utilized as the data input device for the computer itself. While this has greatly improved the computer data entry procedure. This method still suffers from a shortcoming inherent in any punched card system; namely, should the keypunch operator make an error, the entire card must be repunched.

The data input process has been refined by eliminating the punched card and causing the data applied to a keyboard by a human operator to be directly recorded on magnetic tape. This elimination of the punched card has substantially advanced the computer data input art. In such systems the human operator sitting at a keyboard "types" the data, and it is stored in 80 character records in a buffer storage unit. Operator errors can be corrected simply by backspacing and retyping the correct characters. When the operator has completed a record, that 80 character record is transferred from the buffer storage to magnetic tape. The operator then continues on with the next 80 character record. After all of the data has been placed on the magnetic tape by this method, the tape is removed from the data entry apparatus and is connected to the computer input equipment for entry of the data into the computer.

While this direct magnetic recording of the "typed" data has substantially benefited the computer industry, present data entry systems utilizing such equipment still have numerous disadvantages. The fixed record length, generally 80 characters, is often restrictive and wasteful of both operator time and buffer storage memory. While 80 characters has come to be accepted as a standard record length, numerous data can best be handled by records of other lengths. Thus, a variable record length is desirable. The manual operation of transferring the magnetic tape from its location in the data entry system to the computer input device is a cumbersome and time consuming thing. In addition, it present the possiblity of tape damage due to mishandling. A further disadvantage of these existing data energy systems is their high cost. Elaborate equipment is required to transform the operator's key strokes into the coded characters in the buffer storage and then into the magnetic characters stored on tape. Statistically, a good keypunch operator can enter about 75,000 key strokes of data per day, making about 3 to 5 strokes per second. A rate of 3.3. key strokes per second means that approximately 300 milliseconds elapse between each character of input data. Since the equipment which transfers this data to the buffer storage can operate in the microsecond range, the equipment is idle for a considerable proportion of the time, waiting for the operator to depress another key.

The present invention is a data entry system for computers which is capable of operation with a variable record length, on a shared time basis between several operators, and in which there is no necessity for the manual handling of magnetic tape between the entry of data by the operator and the passage of that data to the computer. In the system of the present invention a control unit continuously scans a plurality of input units at a speed in the microsecond range. When a data character is available in an input unit, the control unit transfers that character to a record memory within the control unit and associated with the particular input unit. The control unit then continues scanning. The transfer of the character from the input unit to the control unit record memory takes place in a few microseconds. Consequently, even if all input units simultaneously have characters waiting to be transferred to control unit record memory locations, the control unit is capable of accomplishing all of these transfers and completing a full scanning cycle in less time than elapses between input characters at any one input unit. Once a record is completed at a particular input unit, the control unit transfers that record to a magnetic tape associated with the input unit. Each data-character-to-tape transfer likewise takes place in microseconds and so is accomplished before any delay is noticeable to the operators. After the entire data has been transferred to the magnetic tape, the tape is caused to play the data through the control unit to the computer. This computer entry takes place without any manual handling of the magnetic tape. If desired, after the data has been stored on the magnetic tape and prior to the compute entry of the data, the data can be verified by comparing that which is stored on the magnetic tape with a second set of input data.

Figure 2:
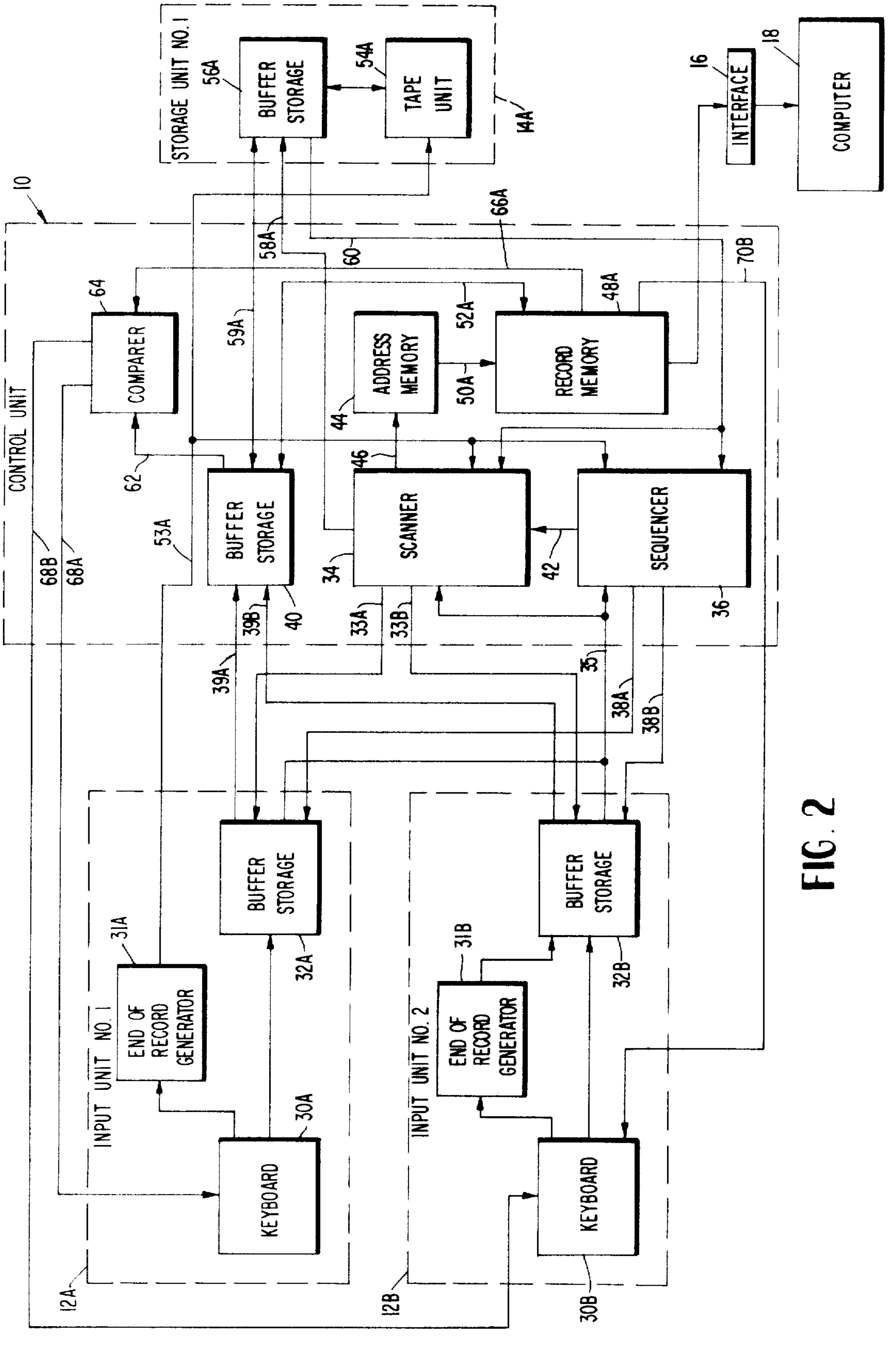

These and other aspects and advantages of the present invention are apparent in the following detailed description and claims, particularly when considered in conjunction with the accompanying drawings in which like parts bear like reference numerals. In the drawings:

FIG. 1 is a block diagram of the data energy system of the present invention; and FIG. 2 is a block diagram showing additional details of the input unit and the control unit utilized in the present invention.

The data entry system of the present invention is depicted in block diagram form in FIG. 1. As there depicted, a control unit 10 receives input data from a plurality of input units. FIG. 1 illustratively shows size input units, 12A through 12F, each connected to control unit 10. Control unit 10 is also connected to a like plurality of data storage units, shown in FIG. 1 as storage units 14A through 14F. Each of the input units 12A—12F includes a keyboard, similar to the keyboard of a typewriter, which converts the input data into electrical pulses that are transmitted to control unit 10. By way of example, each of the input units 12A—12F might be of the type manufactured by the Micro Switch Division of Honeywell, Inc. as Model No. 50RW-1. Each of the storage units 14A—14F illustratively might include a magnetic tape recording unit such as that manufactured by Digi-Data Corporation as Model No. 5101.

Control unit 10 continuously scans the several input units 12A—12F, and when an input character is ready for storage from a particular input unit, then control unit 10 reads that input character into a record memory unit within control unit 10. Control unit 10 scans at a speed in the order of 1 scan per microsecond, thus requiring 6 microseconds to scan the six input units 12A—12F. When data is present at an input unit, it is transferred to the record memory within control unit 10 in a time in the order of 12 microseconds. Since each operator requires about 300 milliseconds between input strokes, the operators are unaware of the time required for the control unit to scan and to receive input data from the several input units.

After a particular operator has completed an input record, depresses a key on the keyboard of her input unit which sends an end-of-record signal from her input unit, for example input unit 12A, to control unit 10 and to the associated storage unit 14A. Alternatively, this end-of-record signal could be generated automatically by the input unit at the end of each record, thus requiring no additional operator function. For example, each of the input units 12A—12F might include programmable means for generating an end-of-record signal automatically after each entry of the desired number of data characters. Thus, illustratively, if input unit 12A is programmed for a 58 character data length, then that input unit automatically transmits an end-of-record signal after each 58 character entry by the operator. Should a particular record be of a shorter length, the operator either can manually fill the remainder of the record with blank or zero characters or can depress a key to automatically fill the remainder of the record with such characters, after which the end-of-record signal is automatically generated.

Upon receipt of the end-of-record signal, the associated storage unit, for example storage unit 14A, prepares itself to receive that record, and control unit 10 transfers the record from the associated record memory to the associated storage unit 14A. Storage unit 14A then backs up and reads out the record which has just been stored in it for comparison with the record in the record memory within control unit 10. Thus any errors, such as parity errors, which might have occurred during transfer of the record from the record memory to the storage unit 14A, can be detected. This transfer and check of data from control unit 10 to storage unit 14A takes place in a maximum time in the order of 300 milliseconds during which time the operator is preparing the next record for entry, and so she is unaware of its occurrence. The record is transferred one character at a time and checked on e one character at a time, and each character operation takes place in a time in the order of 50 microseconds, and so the other operators are not held up during the transfer and check. Should the check indicate that the record was not properly transferred, an indication is sent to the associated input unit, and the operator can depress a control to cause the transfer to be repeated.

When all of the records from a particular input unit such as input unit 12A have been stored in the associated storage unit such as storage unit 14A, the records can be verified by having them again keyed through an input unit for comparison with the stored records. Thus, for example, if an operator at input unit 12A has transmitted several records which have been stored on magnetic tape in storage unit 14A, to verify these records another operator, for example using input unit 12B, can repeat these same records. In the verifying mode, the data applied by an input unit such as input unit 12B is compared within control unit 10 with the previously keyed data which is stored within storage unit 14A. Should the stored data and the newly keyed data not compare correctly, an error signal is transmitted to the input unit 12B. This error signal locks the keyboard so that no more data can be entered and activates an error indicator. The operator can then determine whether the data stored in unit 14A is not correct or whether during verification she has entered incorrect data. Should the stored data be in error, the operator can correct it and then proceed with the verification.

After all of the input operators have completed their records, the data is transferred from the magnetic tape within the storage units 14A—14F to the utilizing computer. This might take place, for example, during late night hours when no data is provided for input to the system. Each of the storage units 14A—14F in turn transfers its data, one record at a time, to the record memory within control unit 10 from which the records are transferred through interface unit 16 to the utilizing computer 18. Interface unit 16 transforms the data from the format in which it is stored within the record memory of control unit 10 into the format required by the particular computer. This computer format, of course, is dependent upon the characteristics of the particular computer being utilized. For example, if each character is represented by seven bits which in control unit 10 are stored on two parallel tracks, and the associated computer 18 requires seven-bit characters on a single track, then interface unit 16 transforms the seven-bit two-track characters into a seven-bit single-track format. The input data is thus transferred to the computer without any requirement for manual handling of the magnetic tapes from storage units 14A—14F.

FIG. 2 depicts the data entry system of the present invention in detailed block form and shows input units 12A and 12B, storage unit 14A, the control unit common equipment, and the control unit equipment associated with input unit 12A. Thus, all components in FIG. 2 designated by reference characters having both numbers and letters, such as record memory 48A, are associated with input unit 12A and have counterparts for the other input units 12B—12F; while those components designated by reference characters having only numbers such as scanner 34, are used in common by all input units.

Each input unit such as input unit 12A includes a keyboard 30A, an end-of-record generator 31A, and a buffer storage unit 32A. By way of example, buffer storage unit 32A might be a shift capable of receiving and storing the multibit input characters. Scanner 34 within control unit 10, sequentially interrogates each buffer storage unit 32A—32F in turn via associated lines 33A—33F. For this purpose scanner 34 could for example include a ring counter. When a buffer storage unit such as buffer storage unit 32A has an input character within it ready for transfer to control unit 10, that buffer storage unit responds to the interrogating signal from scanner 34 by returning a flag signal to scanner 34 and to sequencer 36 which is also within unit 10. The flag signals from all buffer storage units 32A—32F are transmitted via one bus line 35. This flag signal causes scanner 34 to stop the scanning operation and causes sequencer 36 to commence the data transfer sequence. Sequencer 36 then triggers buffer storage unit 32A via line 38A to cause the character stored within unit 32A to be transferred via line 39A to buffer storage unit 40 within control unit 10. Simultaneously, sequencer 36 applied a trigger signal on line 42 to cause scanner 34 to interrogate address memory 44 by means of line 46. Address memory 44 has stored within it the address within the record memories 48A—48F at which this newly received input character is to be stored. Thus, for example, address memory 44 might include a pulse generator and six memory locations, one for each of the input units 12A—12F. Each memory location has stored within it the address within the record memories 48A—48F in which the next character from its associated input unit is to be stored. In response to a flag signal from input unit 12A, scanner 34 interrogates the memory location within address memory 44 which is associated with input unit 12A, and address memory 44 then applies an enabling signal via line 50A to the record memory 48A address stored in that address memory 44 location. This enables that records memory address to store the input character applied to it via line 52A from buffer storage unit 40. The pulse generator within address memory 44 then applied a pulse to the address memory 44 location associated with input unit 12A to sequence that memory location so that it stores the next record memory 48A address. Once the input character is within the record memory, sequencer 36 frees input unit 12A and becomes inactive, while scanner 34 resumes the scanning operation. The next input unit 12A—12F which has a character within its buffer storage 32A—32F causes this character transfer cycle to be repeated, utilizing its associated record memory 48A—48F and the common scanner 34, sequencer 36, buffer storage 40 and address memory 44.

Each character applied to keyboard 30A is passed not only to buffer storage unit 32A but also to end-of-record generator 31A which counts input characters and generates the end-of-character signal after a preprogrammed number of characters have been counted. Generator 31A thus might illustratively include alterable counting and gating circuitry and a pulse generator. The counting and gating circuitry is programmed to active the pulse generator after the desired number of characters have been counted, thereby generating the end-of-record signal. Thus, if, for example, a 58 character record length is desired, the counting and gating circuitry activates the pulse generator after every 58 characters. Simultaneously with that record's last character flag signal, the end-of-record signal is applied via line 53A to scanner 34, sequencer 36 and tape unit 54A within storage unit 14A. The tape recorder within tape unit 54A then starts, and, when it reaches its operating speed, sends an operating signal to buffer storage unit 56A within storage unit 14A. During subsequent scanner cycles, scanner 34 interrogates buffer storage unit 56A via line 58A, and so long as tape unit 54A provides its operate signal, buffer storage unit 56A responds to each interrogate signal by sending a flag signal via bus line 60 to scanner 34 and sequencer 36. This flag signal interrupts the scanning cycle and initiates the character-transfer sequence. Sequencer 36 applies a signal to scanner 34 to cause an interrogate signal to be applied to address memory 44 to find the record memory address of the first character of that record. Address memory 44 then enables that address within record memory 48A, and the character stored therein is transferred via line 52A to buffer storage unit 40 which transfers it via lines 59A to buffer storage unit 56A within storage unit 14A. This character is then written upon the magnetic tape within tape unit 54A. After that one character transfer, scanner 34 resumes its scanning cycle, and sequencer 36 is inactive. Thus, during each scanning cycle one character is recorded on magnetic tape within tape unit 54A, and so for an 80 character record, 80 cycles of scanner 34 are required for recording on the tape unit. After the complete record is recorded on tape unit 54A, the tape unit reverses itself and backs up to the start of that record. During each subsequent cycle of scanner 34 a character of the just recorded record is transferred from tape unit 54A through buffer storage 56A to buffer storage 40 and via line 62 to comparer 64. Simultaneously, the corresponding character stored within record memory 48A is applied via line 66A to comparer 64, and a comparison check is made between the record as stored in record memory 48A and the record as recorded on tape unit 54A. Should any errors, such as parity errors, be detected, an error signal is sent from comparer 64 to keyboard 30A by means of line 68A, and the operator knows that that record has not been properly recorded on unit 54A. She can, therefore, activate a control which causes the record to again be recorded on tape unit 54A. If the error is not corrected, her equipment can be checked. The time required for this process of transferring the record from word memory 48A to tape unit 54A and checking the record is dependent upon the record length. With a record length of 80 characters, a total time in the order of 300 milliseconds is required. During this time the operator is preparing to enter the next data record. Since the transfer and check takes place one character per cycle of scanner 34, the out other input units 12B—12F are not aware of it, but continue with their own data entry.

After all of the records have been entered by the operator at input unit 12A, they can be verified by repeating the records. For accuracy this should be accomplished by having another operator using another input unit repeat the records. Assume for this purpose that the records are being repeated by an operator at input unit 12B. In the verify mode, the first record to be verified is transferred, one character per cycle of scanner 34, from tape unit 54A, through buffer storage units 56A and 40, to record memory 48A. Thus as the verifying operator enters the record, for example from input unit 12B, each character is transferred through buffer storage units 32B and 40 to comparer 64. Simultaneously, the corresponding character is transferred from record memory 48A via line 66A to comparer 64.

If the recorded character from tape unit 54A does not agree with the character applied through keyboard 30B, comparer 64 sends an error signal via line 68B to keyboard 30B which locks the keyboard to prevent further entry of data. Record memory 48A transmits the character to a visual display on the verifying keyboard such as keyboard 30B by means of a line 70B, and so the verifying operator can see from that display whether the proper character has been stored on the tape within tape unit 54A. If a correction is necessary, she can switch to the recording mode and make that correction. She then continues with the verification. The character transfer operations during this verify mode are, of course, in response to interrogate signals and flag signals, just as in the data entry mode previously described.

After all of the records have been recorded on tape unit 54A and verified, they are ready for entry into computer 18. This, of course, need not be done immediately after the records have been completely stored on tape unit 54A, but could be done during nonpeak hours. A signal is applied through keyboard 30A to cause the data entry system to enter its computer-entry mode for storage unit 14A. This signal is applied to tape unit 54A and to scanner 34 and sequencer 36. The data on tape unit 54A is transferred, in record lots one character per cycle of scanner 34, to record memory 48A. Commands from sequencer 36 then cause scanner 34 to interrogate address memory 46 for the proper address within record memory 48A. This address within record memory 48A is then enabled, and the data record is transferred one character per cycle of scanner 34, from record memory 48A through interface unit 16 to computer 18. After that record has been entered into computer 18, another record is transferred from tape unit 54A to record memory 48A. Accordingly, the data records are transferred from the input units 12, through control unit 10, and storage units 14, to computer 18 with no manual handling of the magnetic tapes.

I claim:

1. A computer data entry system for entering multicharacter data records into a digital computer, said system comprising:

- a first plurality of data input means, each data input means including first storage means for storing a data character applied thereto and means for applying data characters to said first storage means; said first storage means when having a data character stored therein generating a flag signal in response to an interrogating signal;
- a first plurality of data recording means each uniquely associated with one of said data input means, each data recording means including second storage means for storing a data character applied thereto and data recorder means coupled to said second storage means for recording data characters stored in said second storage means and for applying recorded data characters to said second storage means; and
- control means including:
  - a. a first plurality of data record memory means each uniquely associated with one of said data input means, each of said data record memory means including a second plurality of character address memory locations, each of said character address memory locations capable of storing one data character, each of said character address memory locations enabled by an enabling signal applied thereto to receive a data character for storage therein;
  - b. address memory means having:

i. a first plurality of data record memory address locations each uniquely associated with one of said data record memory means and capable of storing one data record memory character address; each data record memory address location in response to an activating signal applied thereto applying an enabling signal to the data record memory character address memory location of the data record memory character address stored in that data record memory address location; and ii. sequencing means for sequencing the data record memory character addresses stored in said data record memory address locations;

c. scanning means including:

i. means for sequentially applying an interrogating signal to said first storage means;

ii. means responsive to flag signals from any one of said first storage means for applying an activating signal to the data record memory address location associated with that first storage means;

iii. means responsive to flag signals from any one of said first storage means for transferring a data character from that first storage means to an enabled character address memory location; and iv. means responsive to flag signals from any one of said first storage means for activating said sequencing means to sequence the data record memory character address in the data record memory address location associated with that first storage means; and d. coupler means coupling each data record memory means to the second storage means of its associated data recording means for transferring data characters to that second storage means for recordation by the associated data recorder means.

2. A system as claimed in claim 1 in which said control means further includes means for transferring data characters from any one of said data recording means to its associated data record memory means and means for coupling said data record memory means to a computer for transferring data characters to said computer.

3. A system as claimed in claim 2 in which said control means further includes comparer means for comparing data characters stored in one of said character address memory locations with data characters stored in one of said first storage means.

4. A system as claimed in claim 3 in which said coupler means includes buffer storage means.

5. A system as claimed in claim 4 in which each of said data input means includes programmable generator means for generating an end-of-record signal after a programmed number of data characters have been applied to said first storage means, said end-of-record signal activating said coupler means to initiate transfer of data characters to the associated second storage means.